B. D. VIERS.
ELECTRICALLY OPERATED EGG BEATER.
APPLICATION FILED NOV. 17, 1917.

1,359,208.

Patented Nov. 16, 1920.

Witnesses

Inventor
B. D. Viers

By Chandler & Chandler
Attorneys

UNITED STATES PATENT OFFICE.

BURR D. VIERS, OF RED LODGE, MONTANA.

ELECTRICALLY-OPERATED EGG-BEATER.

1,359,208.   Specification of Letters Patent.   Patented Nov. 16, 1920.

Application filed November 17, 1917. Serial No. 202,603.

*To all whom it may concern:*

Be it known that I, BURR DELL VIERS, a citizen of the United States, residing at Red Lodge, in the county of Carbon, State of Montana, have invented certain new and useful Improvements in Electrically-Operated Egg-Beaters; and I do hereby declare the following to be a full, clear, and exact description of the invention, such as will enable others skilled in the art to which it appertains to make and use the same.

This invention relates to improvements in egg-beaters and particularly to electrically operated egg-beaters.

One object of the present invention is to provide a novel and improved device of this character which is readily adapted for disposition on the top of an ordinary glass or tumbler.

Another object is to provide a device of this character which is novelly constructed for being taken apart for cleaning and repairs.

Other objects and advantages will be apparent from the following description when taken in connection with the accompanying drawing.

Figure 1:
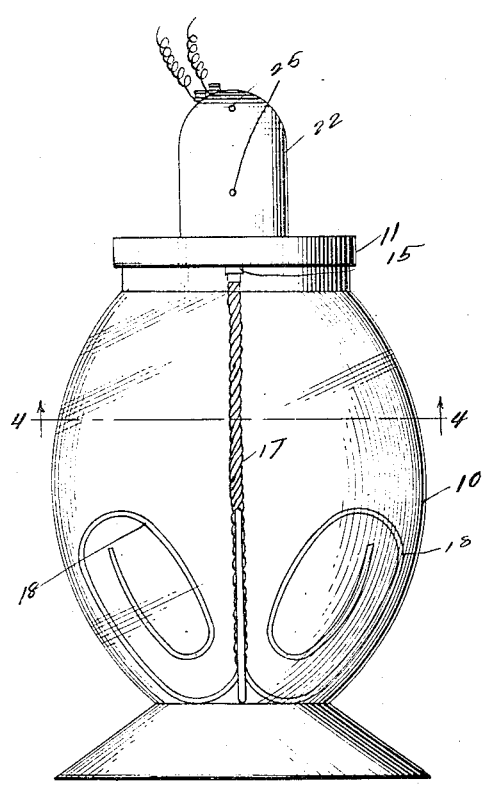
Figure 1 is an elevation of my improved egg-beater.
Figure 3:
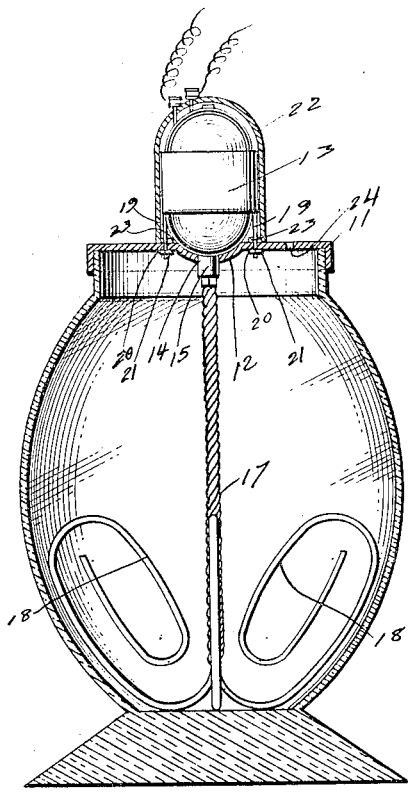
Fig. 3 is a vertical transverse sectional view taken on the line 3—3 of Fig. 2.
Figure 4:
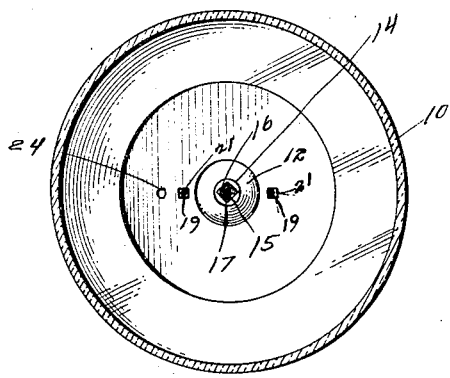
Fig. 4 is a horizontal sectional view taken on the line 4—4 of Fig. 1, looking upwardly.
Figure 2:
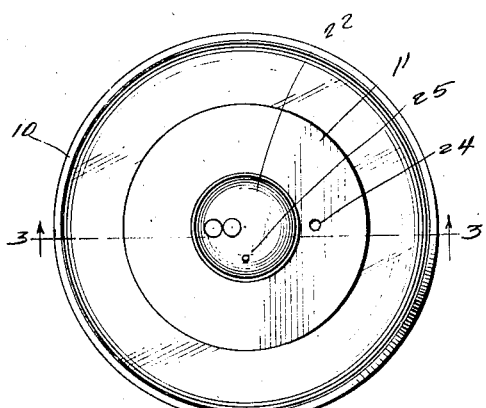
Fig. 2 is a top plan view of the same.

Referring particularly to the accompanying drawing, 10 represents a suitable receptacle into which the eggs are placed. This receptacle is provided with a removable cover 11 which supports the dasher and motor which will now be described.

In the center of the cover there is formed a depression 12 into which the lower end of the motor 13 is seated, while an opening 14 in the center of the bottom of this depression receives the shaft 15 of the motor therethrough. The lower end of the said shaft is formed with a squared socket portion 16 which receives the upper end of the dasher shaft 17, which latter is disposed vertically in the receptacle and has the dasher blades 18 on the lower end thereof. The sides of the motor frame are provided with the depending bolt members 19 which pass through openings 20 in the cover, at opposite sides of the depression 12, nuts 21 being engaged on the lower ends of said bolt members to hold the motor on the cover. A dome-shaped casing 22 is disposed over the motor and has the inwardly directed and perforated lugs 23 on the lower end for the reception, also, of the said bolt members. In the cover, outwardly of the lower edge of the casing, there is formed an air opening 24, while openings 25 are formed in the sides of the casing for facilitating the introduction of oil to the oiling tubes 26, which tubes lead to the shaft of the motor.

It will thus be seen that when the cover is removed from the receptacle, the motor will be removed also, while the dasher shaft will remain in the receptacle. Thus the dasher can be changed or cleaned without taking the motor apart, or removing the motor from the cover.

While I have shown the device as used in connection with a special and preferred form of receptacle, I wish it understood that the device can be used with the ordinary glass or tumbler, onto which the cover will readily fit.

What is claimed is:

In a machine of the class described, the combination with a plate having a depression with an opening through its center and openings through the plate at opposite sides of the depression, of a motor resting in said depression with its shaft extending through the opening therein, bolts on the motor frame extending through the remaining openings and receiving fastening nuts, and a casing inclosing the motor and resting on said plate, the casing having inturned lugs at its lower end perforated for the passage of said bolts, for the purpose set forth.

In testimony whereof, I affix my signature in the presence of two witnesses.

BURR D. VIERS.

Witnesses:
PHILIP DAVARESY,
D. J. SALO.